United States Patent
Bassett et al.

(10) Patent No.: US 10,542,312 B1
(45) Date of Patent: Jan. 21, 2020

(54) HIGH SPEED DATA TRANSFER

(71) Applicant: BAE SYSTEMS Information and Electronic Systems Integration Inc., Nashua, NH (US)

(72) Inventors: Kevin S. Bassett, Nottingham, NH (US); Wojciech J. Krawiec, Amherst, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 73 days.

(21) Appl. No.: 15/880,897

(22) Filed: Jan. 26, 2018

(51) Int. Cl.
*H04N 21/434* (2011.01)

(52) U.S. Cl.
CPC ..... *H04N 21/4341* (2013.01); *H04N 21/4342* (2013.01)

(58) Field of Classification Search
CPC ............. H04Q 2213/13036; H04J 3/12; H04L 12/2861; H04L 12/2898; H04N 21/4341; H04N 21/4342
See application file for complete search history.

(56) References Cited

U.S. PATENT DOCUMENTS

| | | | |
|---|---|---|---|
| 9,369,263 B1* | 6/2016 | Baecher | H04B 17/21 |
| 2016/0227004 A1* | 8/2016 | Conner | H04L 7/0041 |
| 2017/0063383 A1* | 3/2017 | Yang | H03L 7/081 |

* cited by examiner

*Primary Examiner* — Duc C Ho
(74) *Attorney, Agent, or Firm* — Davis & Bujold, PLLC; Scott J. Asmus

(57) ABSTRACT

The system can utilize a standard high speed FPGA interface for a non-traditional use to facilitate the processing of high amounts of streaming digital data or the method can be implemented in other high speed data transfer systems. This system and method include the use of training/calibration pattern techniques implemented in a FPGA, or other system, to calibrate numerous multi-arm demultiplexers. The training/calibration sequence data rate being slower than the input data rate. In one example, the system and method utilized a mono-bit receiver capable of digitizing signals of at least 40 GHz with at least 20 GHz of instantaneous bandwidth.

15 Claims, 15 Drawing Sheets

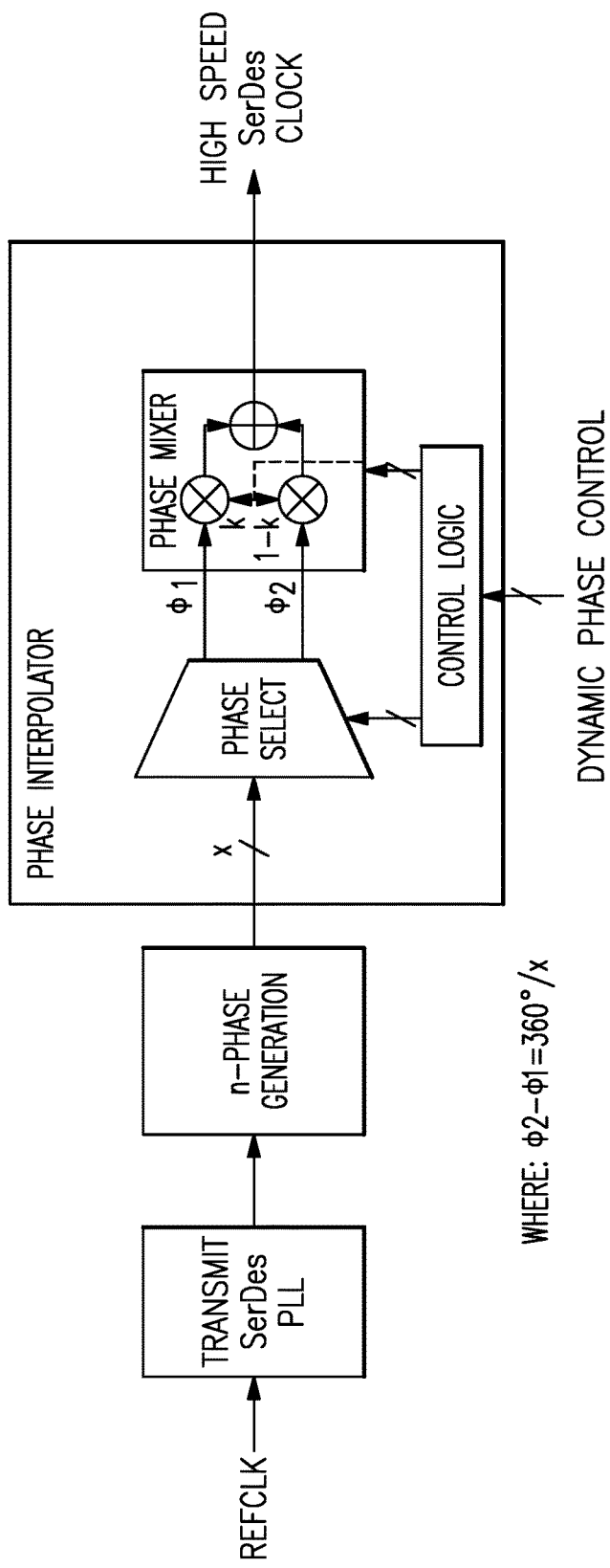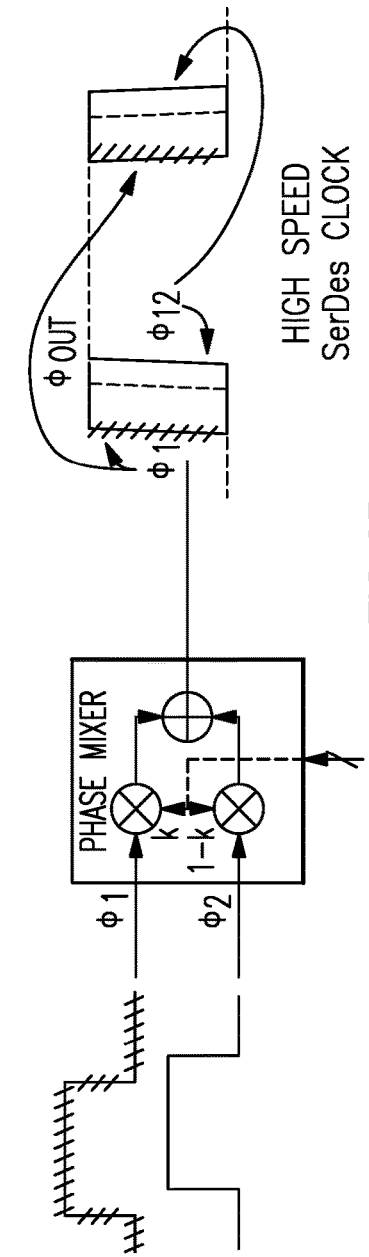
FIG.6A
FIG.6B
WHERE: $\phi 2 - \phi 1 = 360°/x$

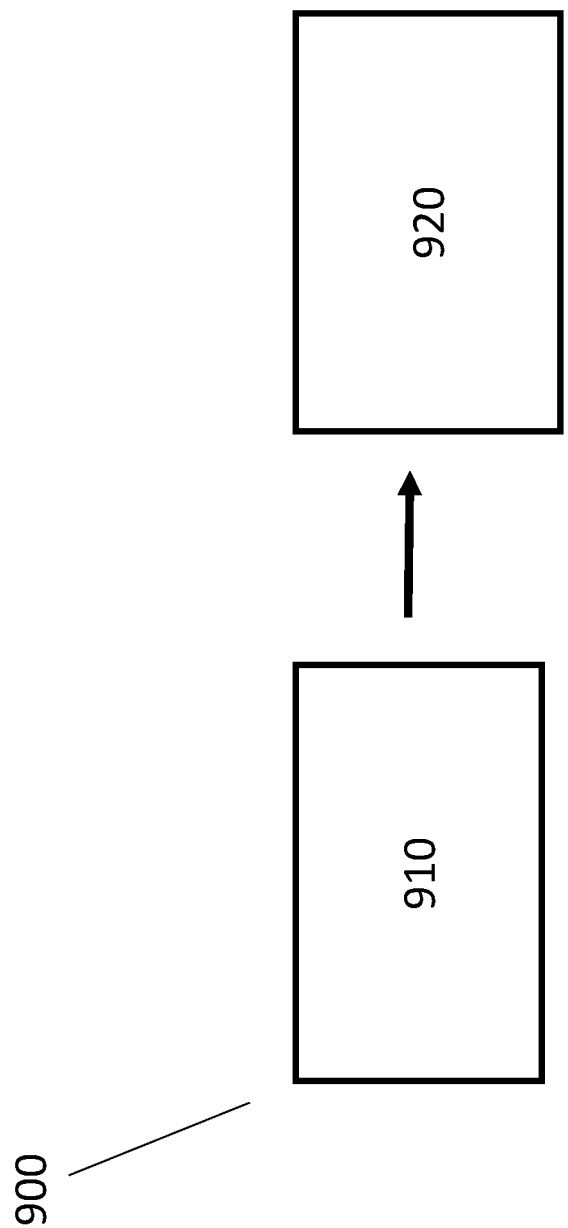

HIGH SPEED DATA TRANSFER

STATEMENT OF GOVERNMENT INTEREST

The invention claimed in this patent application was made with U.S. Government support under contract no. FA8650-15-C-1876 awarded by the U.S. Air Force. The U.S. Government has certain rights in the invention.

FIELD OF THE DISCLOSURE

The present disclosure relates to the direct digitization of microwave (uW) and millimeter wave (mmW) signals and more particularly to the technique of transferring this high-speed digital data into commercial off-the-shelf field programmable gate arrays (FPGAs) for use in uW and mmW transceivers.

SUMMARY OF THE DISCLOSURE

One embodiment of the present disclosure uses commercial based standardized high speed GTX serial transceiver interfaces embedded in FPGAs for a non-traditional use that facilitates the transfer and processing of high speed streaming digital data. The present disclosure provides a system that reduces costly high-speed components, thus significantly reducing power consumption. In one embodiment of the system, a mono-bit direct digitizing receiver is utilized in a radar warning application. The technique is also 'reversible' for the transmission of modulated communication and pulsed signals.

One aspect of the present disclosure is a system for high-speed data transfer comprising: a pattern generator module configured to provide calibration sequence data that is transmitted to a 1:M demultiplexer via a transmitter at a transmitting rate, the transmitter being internal to a field programmable gate array; the 1:M demultiplexer being configured to receive a system input data stream and produce a plurality of serial data streams, the plurality of serial data streams having a data rate that is faster than the transmitter rate; a plurality of receivers for receiving the plurality of serial data streams from the 1:M demultiplexer, the plurality of receivers being internal to the field programmable gate array; and a synchronization module configured to change the phase of a calibration sequence transmit clock to move the calibration sequence data, in time, relative to a system input sampling clock, thereby facilitating high-speed data transfer.

In one embodiment of the system for high-speed data transfer the field programmable gate array further comprises a plurality of internal demultiplexers and a plurality of first in first out modules. In one embodiment of the system for high-speed data transfer, the field programmable gate array further comprises a plurality of clock data recovery modules.

In certain embodiments, M is 4, 8, 16, 32, 64, 128, or 256 and the like. In certain embodiments, the high-speed data is at least 40 GHz with at least 20 GHz of instantaneous bandwidth.

In another embodiment, one or more of the receiver and the transmitter is a transceiver. In yet another embodiment, the synchronization module is selected form the group consisting of a transmit clock phase interpolator, a programmable time delay circuit, a phase shifter, and the like.

In some cases, the pattern generator is implemented via hardware description language of the field programmable gate array.

Another aspect of the present disclosure is a method of calibrating a high-speed data transfer system comprising: providing a high-speed data transfer system having a calibration sequence data rate slower than an input sample data rate; and changing the phase of a calibration sequence transmit clock with enough resolution to move, in time, the calibration sequence data relative to a system input sampling clock edge such that the resolution is less than a period of the system input sampling clock.

One embodiment of the method of calibrating a high-speed data transfer system is wherein changing the phase utilizes a transmit clock phase interpolator, a programmable time delay circuit, a phase shifter, or the like.

In another embodiment of the method of calibrating a high-speed data transfer system, the high-speed data transfer system further comprises a pattern generator module configured to provide calibration sequence data that is transmitted to a 1:M demultiplexer via a transmitter at a transmitting rate, the transmitter being internal to a field programmable gate array.

In another embodiment of the method of calibrating a high-speed data transfer system, the high-speed data transfer system further comprises a plurality of receivers for receiving a plurality of serial data streams from a 1:M demultiplexer, the plurality of receivers being internal to a field programmable gate array.

In certain embodiments, M is 4, 8, 16, 32, 64, 128, or 256 and the like. In certain embodiments, the high-speed data is at least 40 GHz with at least 20 GHz of instantaneous bandwidth.

In yet another embodiment of the method of calibrating a high-speed data transfer system, the 1:M demultiplexer is configured to receive a system input data stream and produce the plurality of serial data streams, the plurality of serial data streams having a data rate that is faster than a transmitter rate.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 6A is a diagram of one embodiment of the present disclosure using phase interpolator circuitry to control transmit clock phase.

FIG. 6B is a diagram for one embodiment of phase interpolator circuitry used to control transmit clock phase according to one embodiment of the present disclosure.

FIG. 9 is a flow diagram of a method for calibrating a high-speed data transfer system.

DETAILED DESCRIPTION OF THE DISCLOSURE

It has been recognized that there is a pressing need for microwave (uW) and millimeter wave (mmW) broad band detection and electronic attack (EA) for radar warning receivers (RWR) and missile warning receivers (MWR) systems on ground, airborne, and marine platforms. The system and method of the present disclosure will allow for very small size, low weight, and low power (SWaP) systems. The simplicity and minimal parts count makes this system affordable for a large array of land, sea, and airborne platforms for radar detection and characterization, guided weapons warning, and countermeasures.

In certain embodiments of the present disclosure, multi-lane, high-speed serial data is received directly by a field programmable gate array (FPGA) serial transceiver circuitry where the data is calibrated/synchronized between lanes. In one embodiment of the system, significant cost and power reduction is achieved by eliminating external 1:16 de-multiplexer integrated circuits. Also, printed circuit board (PCB) development and manufacturing cost, as well as size, can be significantly reduced as the number of traces to be routed is significantly reduced with the present system. In certain embodiments, mono-bit sampling with a 1:4 demultiplexer (demux) running at (≥120 GHz), and using current generations of FPGAs that support greater than 30 gigabytes per second (GBPS) transceiver I/O speeds theoretically achieves greater than 120 GBPS speeds with a single FPGA and a single 1:4 demux.

Figure 1:
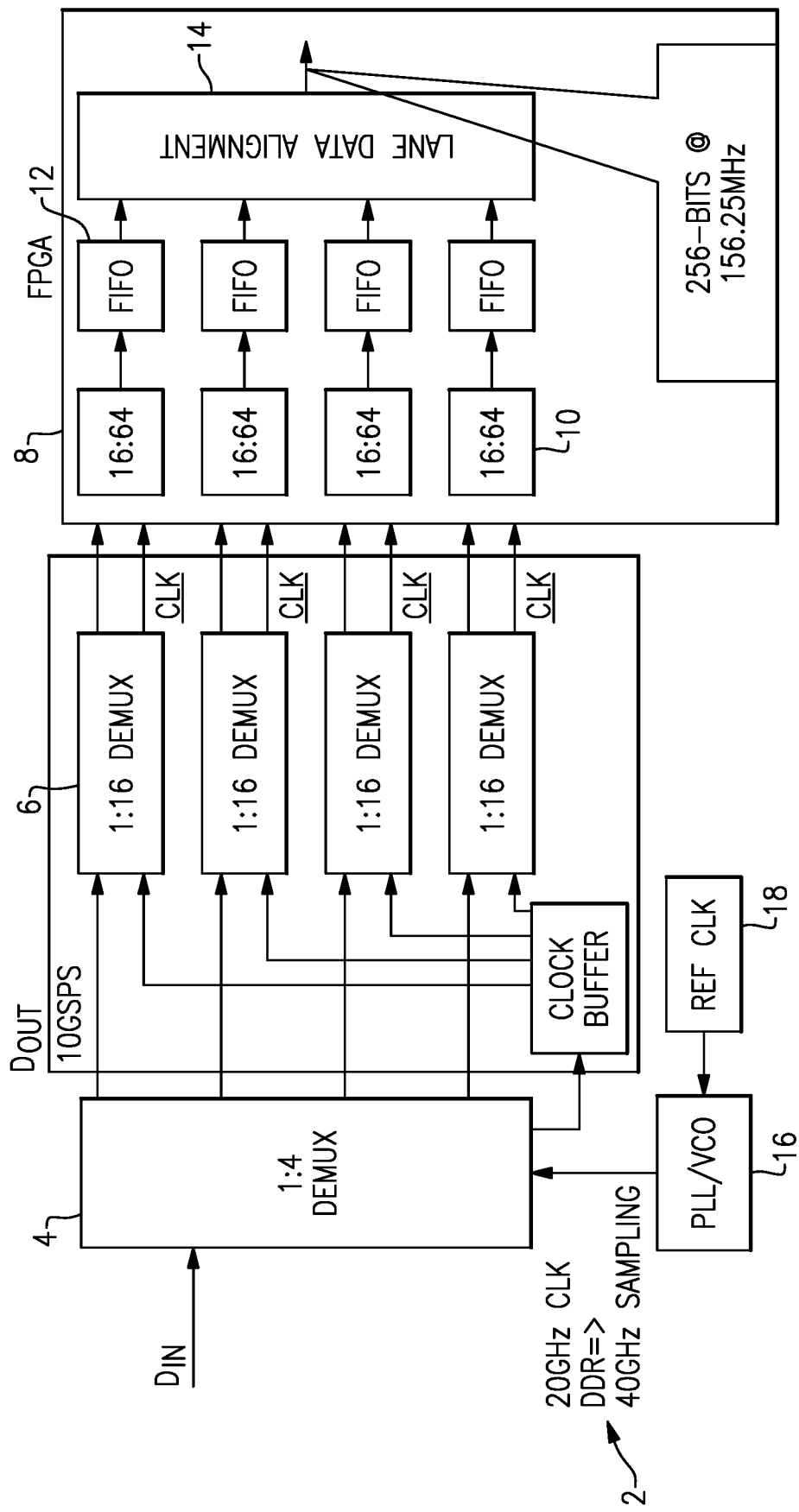
FIG. 1 is a high-level block diagram of a conventional system.

Referring to FIG. 1, a high-level block diagram of a conventional system is shown. A 40 GHz sampling rate was chosen 2 to achieve a 20 GHz instantaneous measurement bandwidth. A 1:4 demux 4 was used to reduce the data rate to 10 giga-samples per second (GSPS) for a single lane with additional 1:16 demuxes 6 continuing to reduce the data rate to 625 MSPS which is compatible with conventional FPGA 8 I/Os. Typically, additional demultiplexing 10 is done inside the FPGA prior to measurement processing. FIFOs 12 are needed to bring output data to a single clock domain and for word alignment 14. A phase-locked loop (PLL) 16 is a closed-loop frequency-control system based on the phase difference between the input clock signal and the feedback clock 18 signal of a controlled oscillator. The PLL is an electronic circuit that is used to lock the output frequency of the voltage-controlled oscillator (VCO) with the desired input frequency by constantly comparing the phase of the input frequency with that of the output frequency of the VCO. The PLL is used to generate a signal, modulate, or demodulate it.

Still referring to FIG. 1, an external demux would not be needed if instantaneous bandwidth of 5 GHz or less was desired. This architecture, although successfully implemented in the past, requires external data synchronization and calibration because the 1:16 de-mux chips each power up in a random state. At a 10 GHz sampling rate, this external data synchronization has proven to be very difficult to implement in hardware that operates over temperature extremes and other environmental constraints.

Figure 2:
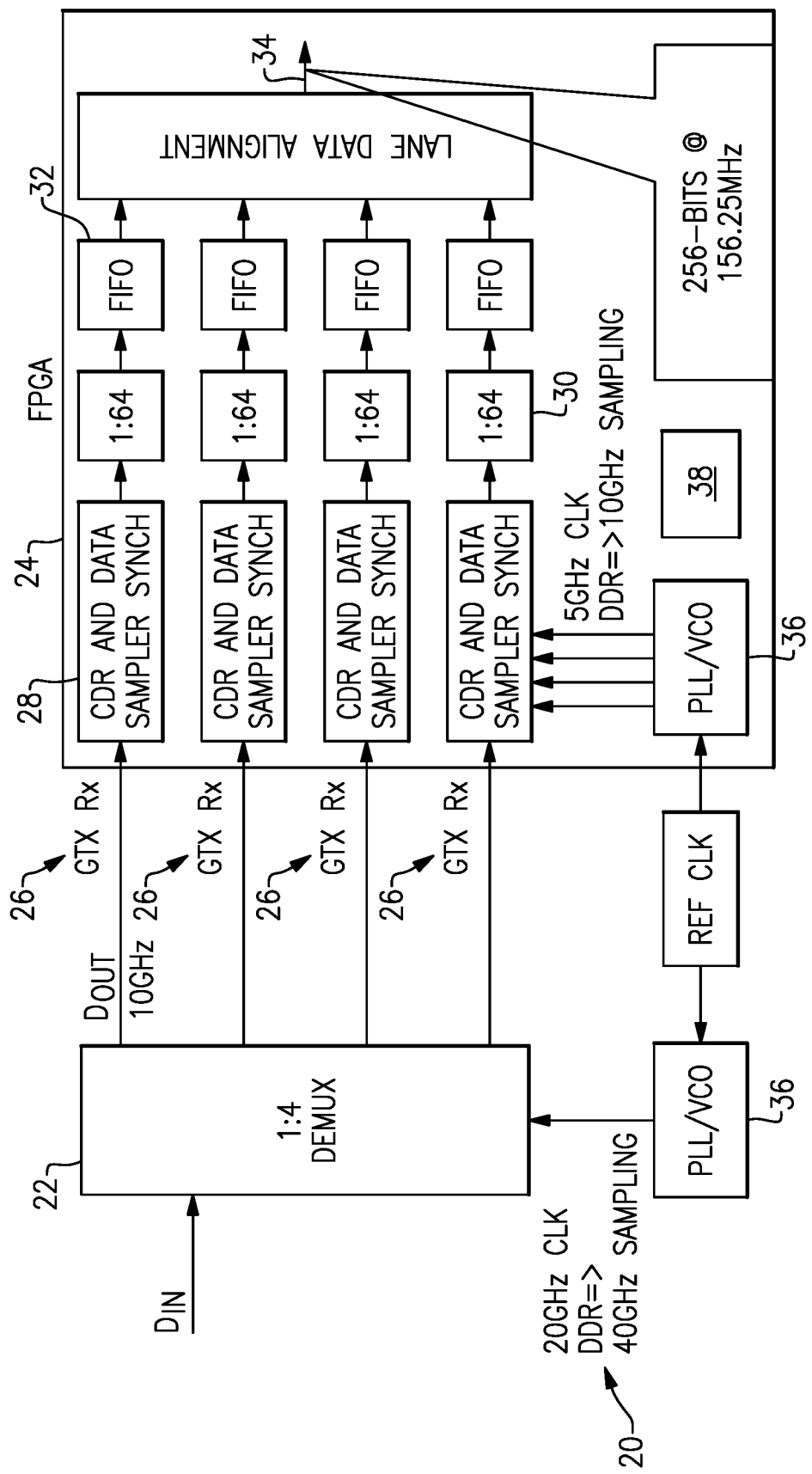
FIG. 2 is a high-level block diagram of one embodiment of a receiver system implementing data alignment/calibration according to the principles of the present disclosure.

Referring to FIG. 2, a high-level block diagram of one embodiment of the system of the present disclosure is shown. The calibration technique described in the present disclosure is useful for traditional architecture with 1:16 de-mux chips and many other arrangements including non-FPGA applications. New families of FPGAs employ various topologies and speed grades of high-speed serial interfaces exceeding 30 GBPS. These interfaces are typically used with a coding standard transmit/receive protocol that combines data and clock information using headers and footers for timing, synchronization, and packetization. Typically 8b10b (or 64b66b) encoding with K-characters for synchronization and bit alignment is used. One embodiment of the calibration technique of the present disclosure relates to systems where training pattern/calibration pattern techniques are implemented using FPGA hardware description language to calibrate numerous multi-arm demultiplexers at calibration sequence rates lower than the input data rate.

Still referring to FIG. 2, in one embodiment a 40 GHz sampling rate was chosen 20 to achieve a 20 GHz instantaneous measurement bandwidth. A 1:4 demux 22 reduced the data rate to 10 giga-samples per second (GSPS) for each of the 4 lanes. A Kintex FPGA 24 was chosen in one embodiment of the present disclosure with four 16 GBPS GTX transceivers 26 used to match up with the 1:4 demux rate, thus eliminating the high speed, high power consuming 1:16 demuxes shown in FIG. 1.

In some cases, Clock Data Recovery (CDR) blocks 28 need data transitions to 'lock' onto incoming data streams. This is achievable when the demux input is driven with a training sequence. In real system operation, it is important to ensure that noise is present to make sure that there are data transitions, because even though CDR circuitry can hold its state (for some FPGA implementations) when there are no transitions, the data capture process may become corrupted due to clock edge time drifts between the internal FPGA sampling clock and the external demux clock. Thus, in one example noise triggered data transitions ensured that the CDRs could adapt to temperature, power supply variations, and other environmental factors' induced drifts between the internal CDR controlled data sampling clock phase and an external data sampling clock phase. In one example, demultiplexing 30 (e.g., 1:64) was done inside the FPGA prior to measurement processing. FIFOs 32 were used to bring output data to a single clock domain and for word alignment 34. One or more phase-locked loop (PLL)/voltage-controlled oscillators (VCO) 36 were also used in certain embodiments. It is important to note that the system can be implemented in many systems, so long as the calibration sequence transmit clock phase control has sufficient resolution to move the calibration sequence data relative to the edge of the system input-sampling clock. In other embodiments, synchronization of the training sequence with the incoming data stream can be accomplished with an external programmable time delay circuit, or the like. In general, any external circuit (phase shifter, programmable time delay, etc.) to implement this feature can be used. These can be described generally as a synchronization module.

One embodiment of the system utilizes a receiver, or a receive path of a transceiver to receive input data at a higher rate of speed than a component is capable of processing. Additionally, this embodiment utilizes a transmitter 38, or a transmit path of a transceiver, to send a training pattern to the receiver at a slower rate than the input data. The training pattern and the input data streams are synchronized such that a change in the phase of a calibration sequence transmit clock moves (in time) the training pattern data relative to the system input sampling clock edge with time resolution much better than, i.e. less than the period of the system input sampling clock, to process high amounts of streaming digital data.

Figure 3:
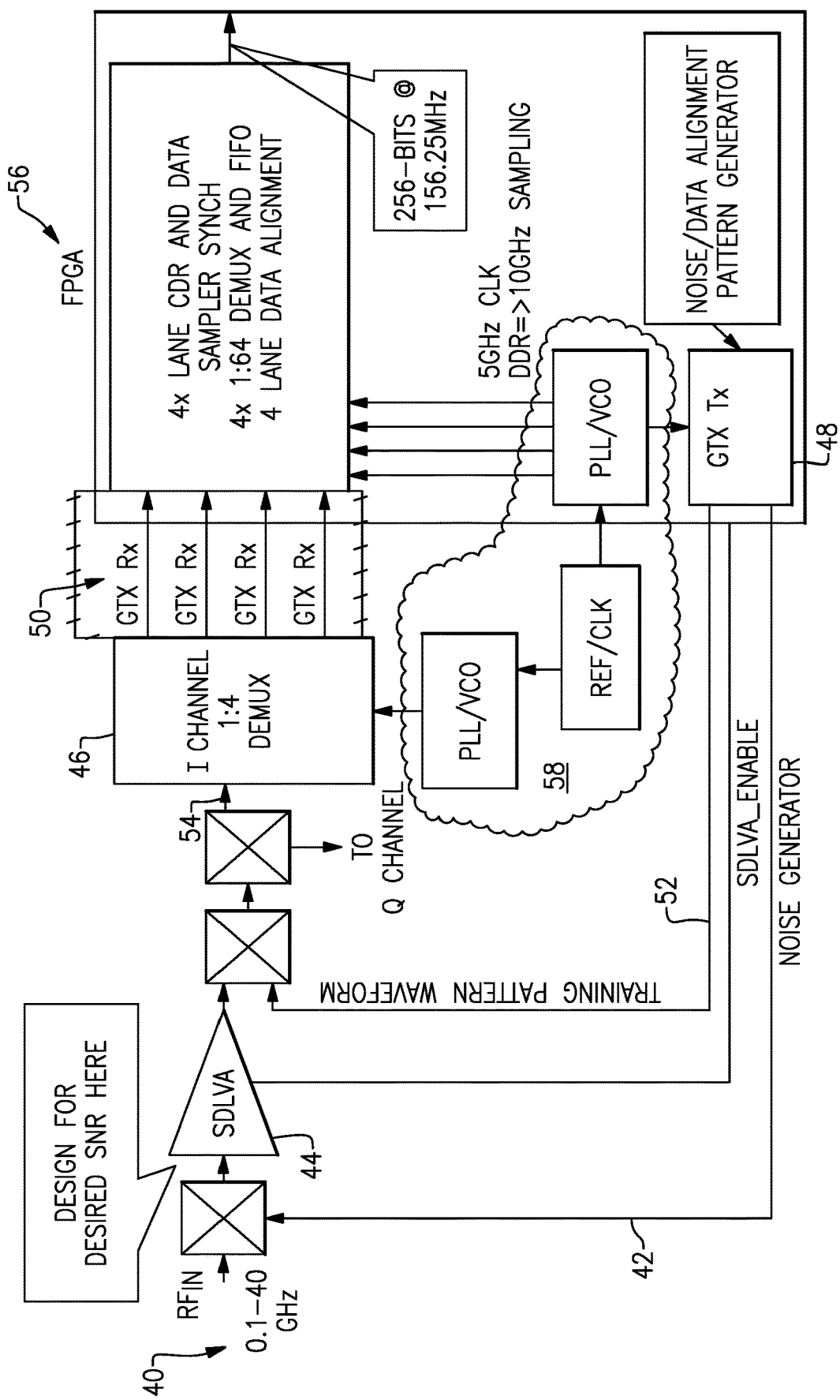
FIG. 3 is a high-level block diagram of another embodiment of a receiver system implementing data alignment/calibration according to the principles of the present disclosure.

Referring to FIG. 3, a high-level block diagram of one embodiment of the system of the present disclosure is shown. More particularly, in one embodiment a signal generator output 40 was combined with a noise source 42 as an input to a successive detection log video amplifier (SDLVA) 44 to digitize the output to a level appropriate to act as the 1:4 demux 46 input. In one embodiment, the signal to noise ratio (SNR) was varied by changing the signal generator output level. At the SDLVA output, a digital signal source generated from a FPGA transmitter 48 was used for production of a training/calibration sequence waveform 52. In one embodiment of the system of the present disclosure, the system eliminates the four 1:16 demux integrated circuits (ICs) that are shown in FIG. 1. In other embodiments, many other components may not be necessary for function so long as the system is able to synchronize the slower training/calibration sequence data stream 52 with the faster input data stream 54.

A Kintex FPGA 56 was chosen in one embodiment of the present disclosure with four 16 GBPS GTX transceivers 50 used to match up with the 1:4 demux rate, thus eliminating the high speed, high power consuming 1:16 demuxes shown in FIG. 1. One or more phase-locked loop (PLL)/voltage-controlled oscillators (VCO) 58 were also used in certain embodiments. It is important to note that the system can be implemented in many systems, so long as the calibration sequence transmit clock phase control has sufficient resolution to move the calibration sequence data relative to the edge of the system input-sampling clock. In other embodiments, synchronization of the training sequence with the incoming data stream can be accomplished with an external programmable time delay circuit, or the like. In general, any external circuit (phase shifter, programmable time delay, etc.) to implement this feature can be used. These can be described generally as a synchronization module.

In one embodiment of the system, on power up, a fixed (and therefore known) training sequence pattern is applied to a demux input to achieve internal data capture logic synchronization. If only one GTX transceiver is used then no training pattern is needed. In certain embodiments, one way to effectively shut down the 'calibration path' would be to send fixed ALL zeros or ALL ones. In some cases, the calibration path is defined as the path between calibration sequence generator 48 (e.g., GTX Tx in one embodiment) and the system front end input digitizer 46 (e.g., an HMC848 1:4 demux in one embodiment).

In one embodiment, a calibration sequence used to align data for all four lanes of a 1:4 demux was '0'-extended 63-bit [6,1] maximal length polynomial: Constant prbs_64: std_logic_vector (63 down to 0):=00000111111010101 100110111011010010011100 010111100101000011000010. This was a DC-balanced sequence (equal number of '1's and '0's) and was suitable for an AC coupled data path. In one embodiment, 64-bit wide parallel data coming from each receivers 50 (GTX Rx path) data-out port went to bit shifter blocks and then to circular correlators. In some cases, correlators can be implemented before bit shifters and retain the same functionality. In this example, since each lane's 1:64 internal FPGA transceiver demux powers up in a random state, bit shifting multiplexers were needed to align parallel data between the many lanes. In certain embodiments, the system may calibrate data from any demux. In some cases, the demux may be 1:4, 1:8, 1:16; 1:64, or 1:M, and the like, where M is 4, 8, 16, . . . . In certain embodiments, the demux may be in the form of N:M, where N is 4, 8, 16, . . . .

Figure 4A:
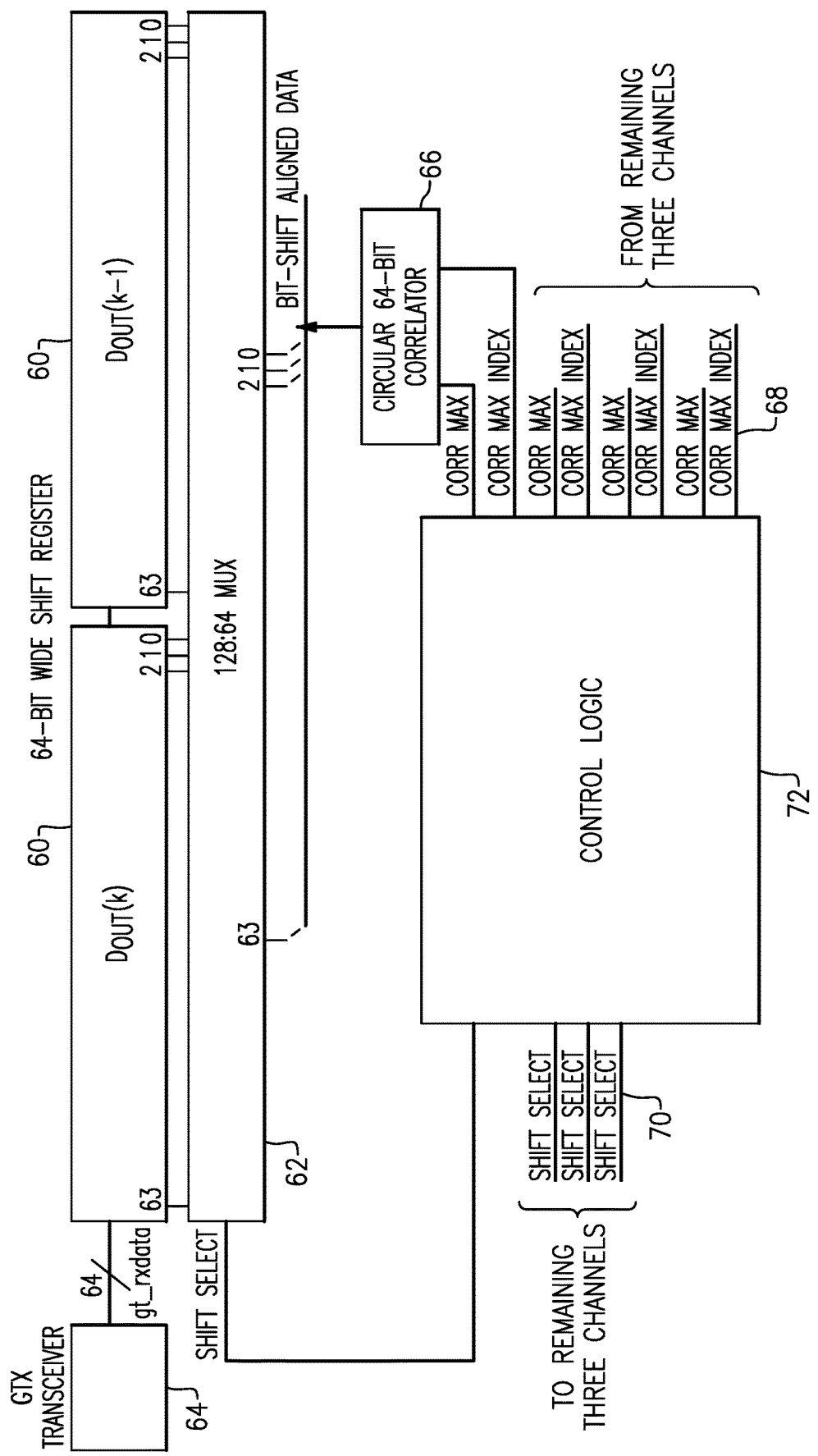
FIG. 4A is a diagram of one embodiment of the system utilizing lane, bit alignment logic according to the principles of the present disclosure.

Referring to FIG. 4A, a diagram of one embodiment of the system of the present disclosure is shown. More specifically, two stages of 64-bit wide shift registers 60 with a 128:64 multiplexer 62 were used to facilitate bit alignment between lanes. This is just one example of how one can implement bit shifting logic to achieve bit alignment (relative to a fixed, known data pattern) for parallel data coming from multiple GTX transceiver lanes 64. First, each circular, 64-bit correlator 66 determines the integer, bit shift value of the incoming, parallel lane data (i.e., from a demux) relative to a fixed, known training pattern (being generated by a pattern generator module). There is also a maximum correlation value available, which is a measure of signal 'quality'. If there are no bit errors, the correlation value will be the maximum. This information (maximum correlation value and corresponding max correlation index) 68 from each lane is then used to set the shift select value 70 for each lane and to bit-align the parallel data with the use of control logic 72. Note that when the parallel data coming out of the shift registers is aligned, it does not mean it is identical for each lane. Again, there can be multiple ways to accomplish the processing of high amounts of streaming data, but in general for bit-aligned parallel data from a 1:4 demux there will be groups like the following: [D1_64] and [D2_64 D3_64 D4_64] or [D1_64 D2_64] and [D3_64 D4_64] or [D1_64 D2_64 D3_64] and [D4_64]. The choice will depend on the particular implementation. When lane data alignment is achieved, the data in each group will be identical, but the data in the first group relative to the data in the second group will be shifted by one bit. This is to account for the fact that a 1:4 demux samples each bit of the calibration sequence four times. Therefore, for one 1:4 de-mux output sample (four bits), (k−1)-th bit of the training sequence is present on output D4 (or D4 and D3) and (k)-th bit of the training sequence is present on outputs D3, D2 and D1 (or D2 and D1) for example. In effect, the calibration sequence for D4 (or D4 and D3) is shifted by one, relative to the calibration sequence for D3, D2 and D1 (or D2 and D1) as explained in other sections of this disclosure.

Figure 4B:
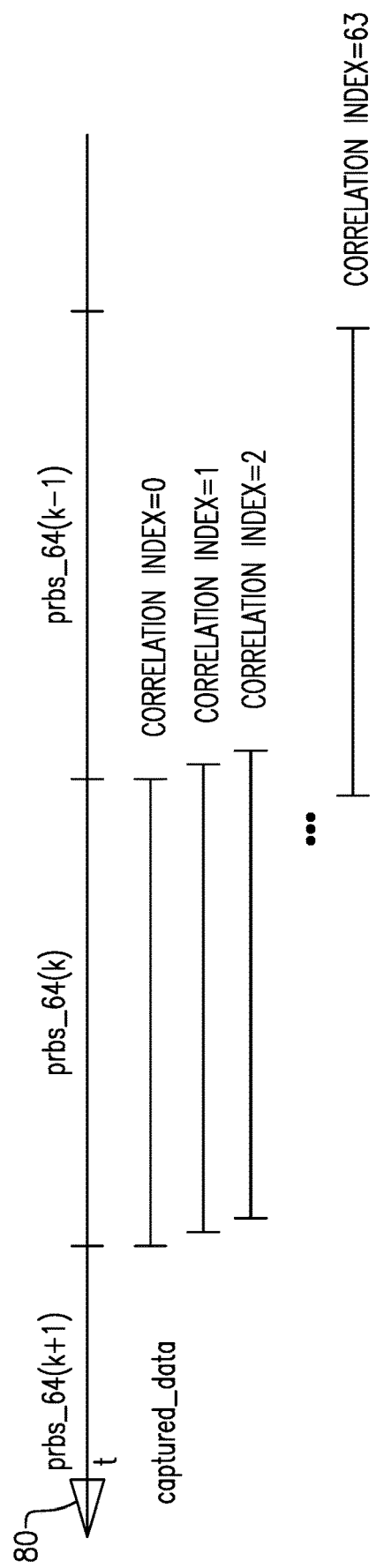
FIG. 4B is a diagram of an explanation of the value generated by a circular correlator as a function of bit shift according to the principles of the present disclosure.

Referring to FIG. 4B, a diagram of one explanation of the value generated by a circular correlator as a function of bit shift according to the principles of the present disclosure is shown. In some cases, logic determines how data in each channel is shifted relative to each other and then applies the correct shift values to align the data between the various channels. To simplify the following discussion, the time arrow 80 is assumed to point to the left in the figure in part because the least significant bit (LSB) in the parallel data word corresponds to the oldest sample. In general, possible solutions depend on how the receiver's serial-to-parallel conversion logic 'locks' onto incoming data. In one embodiment of the system of high-speed data transfer of the present disclosure, each lane's logic is independent. Because it is possible to 'lock' onto different portions of the incoming data sequence, bit align logic is needed to synchronize the data. FIG. 4B demonstrates how the value of the correlation index changes as a function of bit shift values between a reference 64 length pseudo random binary sequence (prbs_64) training word and a digitized word from the SDLVA as used in one embodiment.

In some cases for calibration training, 64-bit long sequences (as shown in FIG. 4B) are sent repeatedly: prbs_64=0000011111101010110011011101101001 0011100010111100101000110000 10=0x07EACDDA4E2F 28C2. In some cases, the least significant bit (LSB) is on the right side and the most significant bit (MSB) is on the left side. For an incoming receive data 64-bit parallel word, the LSB corresponds to the oldest sample and the MSB corresponds to the newest sample. In some embodiments, correlator modules allow for detection of the position of the captured data relative to the nominal position for each channel.

This is accomplished by rotating the input pattern left or right. To rotate left use the following sequence:
0000011111101010110011011101101001001110001011110010100011000010
0=0x07EACDDA4E2F28C2=>correlator max index=0
0000111111010101100110111011010010011100010111100101000110000100
0=0x0FD59BB49C5E5184=>correlator max index=63
0001111110101011001101110110100100111000101111001010001100001000
0=0x1FAB376938BCA308=>correlator max index=62
0011111101010110011011101101001001110001011110010100011000010000
0=0x3F566ED271794610=>correlator max index=61
0111111010101100110111011010010011100010111100101000110000100000
0=0x7EACDDA4E2F28C20=>correlator max index=60
1111110101011001101110110100100111000101111001010001100001000000
0=0xFD59BB49C5E51840=>correlator max index=59
1111101010110011011101101001001110001011110010100011000010000001
1=0xFAB376938BCA3081=>correlator max index=58
1111010101100110111011010010011100010111100101000110000100000011
1=0xF566ED2717946103=>correlator max index=57, and so forth.

To rotate right:
0000001111110101011001101110110100100111000101111001010001100001
1=0x03F566ED27179461=>correlator max index=1
1000000111111010101100110111011010010011100010111100101000100001
0=0x81FAB376938BCA30=>correlator max index=2, and so forth.

The above helps to show how incoming data for the one or more receive channels are shifted relative to each other as a function of correlator max index values (or their difference) assuming that the 1:4 demux samples the same bit of the incoming sequence for ch0 and ch1 outputs. For example ch0 and ch1 data are:
ch0: 0000001111110101011001101110110100100111000 101111001010001100001=>ch0 correlator max index=1
ch1: 1000000111111010101100110111011010010011100 010111100101000110000=>ch1 correlator max index=2
where data for ch1 is one clock cycle 'early' relative to ch0 data OR data for ch0 is one clock cycle 'late' relative to ch1. This is important because in certain embodiments bit shifters work in only one way, i.e., they can 'time advance' the sequence (for increasing value of the select input). Therefore, in certain embodiments time correction is applied to channel data requiring moving the data forward. In the example above that would be channel 0. So, for 0x03F566ED27179461 applied to the input of ch0 bit shifter and select input set to "000001", a bit shifted output of 0x81FAB376938BCA30 is obtained (i.e., time aligned with ch1).

In certain embodiments, ch1 correlator max index−ch0 correlator max index=1=>a positive difference. The difference is then applied to the bit shifter select input of the channel. There, the index of which is subtracted from the other channel index and the difference is positive (≥0). In some cases, ch0 correlator max index−ch1 correlator max index=−1. As a general notion, in a 1:4 demux example it is important to find the channel relative to which of the three other channels require data 'time advancing' and then apply bit shifting equal to the respective difference of correlation indexes to those channels.

In one example test setup, FPGA GTX transceivers were configured for 10 gigasample per second (GSPS) operation. There, the transmit (Tx) port sent training/calibration data at the maximum rate of 10 GSPS. This created a challenge because the 1:4 HMC848 demux sampled data at a 40 GSPS rate. The increased speed meant that each bit of the calibration sequence, as sent by the Tx port, was sampled four times. Because of an unknown phase relationship between the internal Tx port clock used to send the calibration data and the demux 1:4 sampling clock, some of the bits out of the four demux 1:4 output bits contained sampled data corresponding to (k)-th bit of the calibration sequence and some contained data corresponding to (k−1)-th bit of the calibration sequence.

Figure 5A:
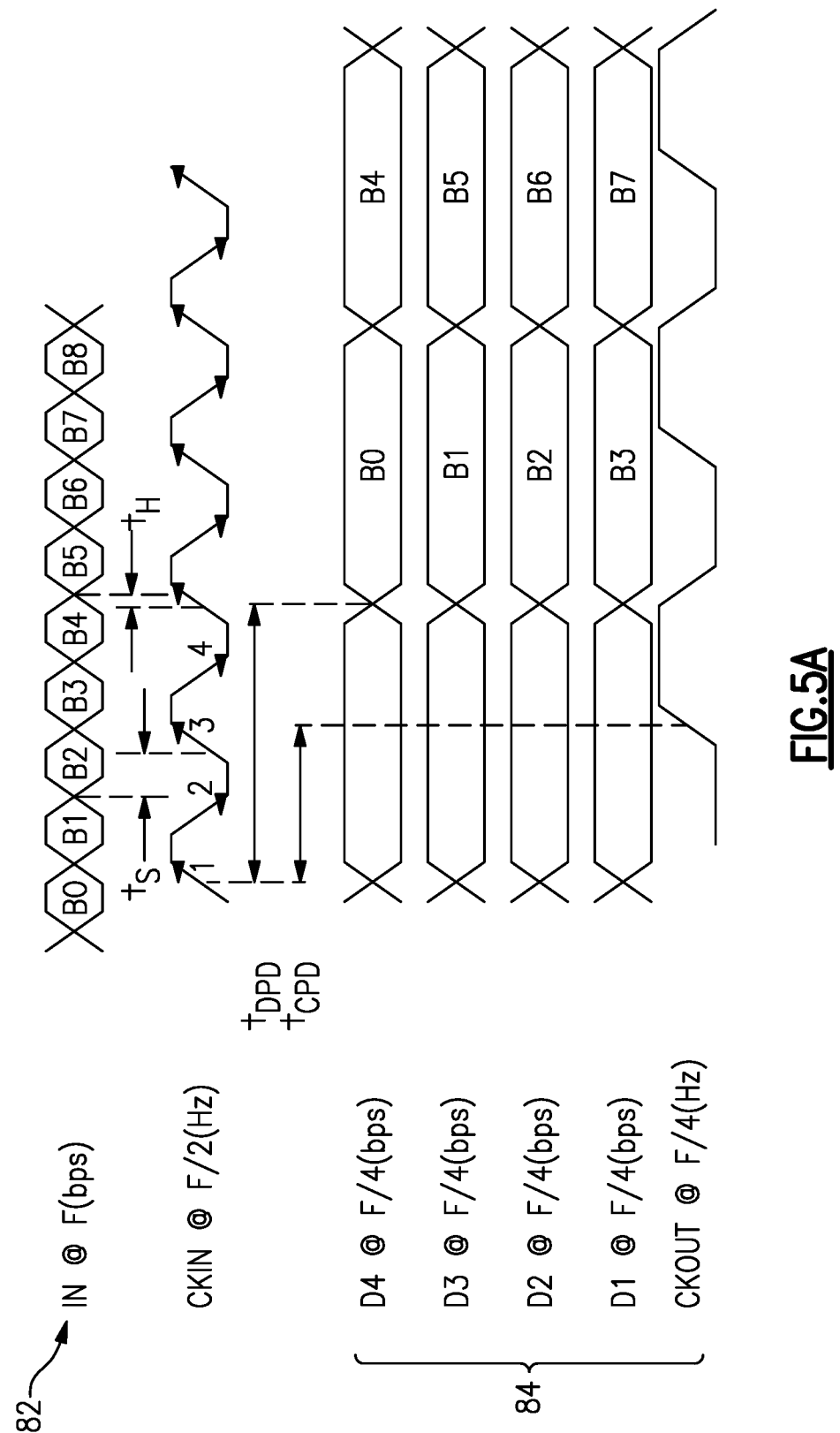
FIG. 5A is a diagram illustrating 1:4 demux operation showing phase relationships according to the principles of the present disclosure.

Referring to FIG. 5A, a diagram showing possible phase relationships for the output bits for one embodiment illustrating the need for transmit clock phase control for a training pattern generator according to the principles of the present disclosure is shown. More specifically, the input data 82 for the 1:4 demux (e.g., HMC848) was at 40 GSPS and the output data D4/D3/D2/D1 84 was at 10 GSPS. FIG. 5A demonstrates the operation of a 1:4 demux embodiment and how the 4-bit data is ordered. Note that in certain embodiments, the HMC848 1:4 demux output clock is not used and an internal FPGA CDR logic takes care of the internal FPGA data sampling clock phase alignment.

Figure 5B:
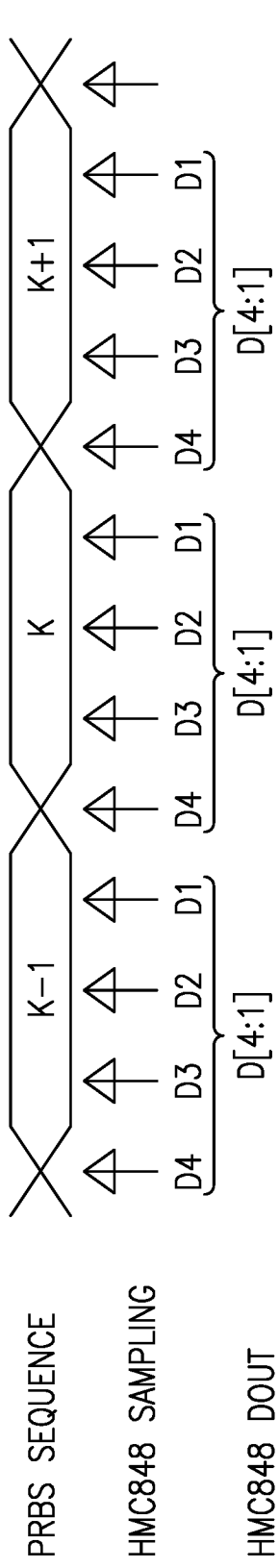
FIG. 5B is a diagram showing possible phase relationships for the output bits for one embodiment illustrating the need for transmit clock phase control for a training pattern generator according to the principles of the present disclosure.
Figure 5C:
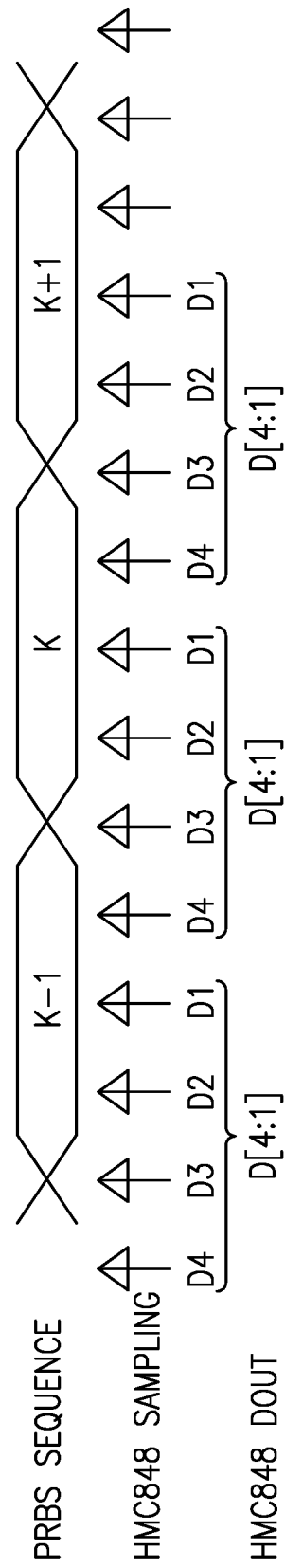
FIG. 5C is a diagram showing possible phase relationships for the output bits for one embodiment illustrating the need for transmit clock phase control for a training pattern generator according to the principles of the present disclosure.

Referring to FIG. 5B, a diagram showing possible phase relationships for the demux output bits for one embodiment illustrating the need for transmit clock phase control for a training pattern generator according to the principles of the present disclosure is shown. More specifically, the output data for a 1:4 demux, D4/D3/D2/D1, shows that D4 is 'unstable' and samples either the (k)-th or (k−1)-th bit, while D3, D2, and D1 are 'stable' and sample the (k)-th bit. Referring to FIG. 5C, a diagram showing possible phase relationships for the output bits for a 1:4 demux according to the principles of the present disclosure is shown. More particularly, the output data D4/D3/D2/D1 shows that D4 is 'stable' and samples the (k−1)-th bit, D3 is 'unstable' and samples either the (k)-th or the (k−1)-th bit, and D2 and D1 are 'stable' and sample the (k)-th bit.

FIGS. 5B and 5C illustrate the problem of data alignment for an unknown relationship, which can also change as a function of power supply voltage and temperature between the phase of training/calibration sequence clock and the data input sampling clock. One way to resolve this issue is by utilizing a unique feature of Xilinx FPGA transceivers that allows the user to control the phase of the FPGA Tx transmit clock (e.g., 48 in FIG. 3). This control allows for shifting the data eye for the training pattern (e.g., 52 in FIG. 3) relative to the demux sampling clock and allows one to determine if particular lane data corresponding to D4/D3/D2/D1 demux outputs belonging to the (k) or (k−1)-sequence, as shown above.

Referring to FIG. 6A, a diagram of one embodiment of the present disclosure using phase interpolator circuitry to control transmit clock phase is shown. This particular version of the synchronization module is instantiated in a Xilinx Kintex FPGA. In general, any type of circuit (phase interpolator, programmable time delay, etc.), internal or external can be used for the purpose of 'moving' the time calibration sequence data eye relative to the system input sampling clock. Referring to FIG. 6B, a diagram of one embodiment of the present disclosure using phase interpolator circuitry to control transmit clock phase is shown. FIG. 6B illustrates clock edge movement (relative to 'nominal' position) as a function of a phase control word ignoring, for a moment, any long term drifts in the system. In this embodiment, a master 1:4 de-mux (HMC848) sampling clock (from PLL) and a master GTX Tx path clock (from PLL) are used for a fixed phase interpolation value, since they are slaved to the same reference clock. In some cases, they are in sync, i.e. the frequency is not the same but their phase relationship is fixed. FIG. 6B further illustrates how the edge of the Tx path clock changes relative to the nominal position of this clock and therefore also relative to the 1:4 de-mux sampling clock. This in effect allows one to 'move' the data eye of the calibration sequence relative to the 1:4 de-mux sampling clock as illustrated in FIGS. 5B and 5C.

In one embodiment of the system of the present disclosure for automatic calibration, a stability detector module is used. This module declares that data is stable when data does not change for at least 1024 clock cycles. For data sampled close to the middle of the data eye, the received data is said to be 'mostly' stable. That means that stability detectors will declare data stable most of the time. On the other hand, when data is sampled during logic state transitions (e.g., when setup/hold time requirements are violated), the stability detector will not declare the data stable (or it will happen infrequently). In some cases, control logic can monitor the stability detector module outputs when the Tx clock phase is being changed and then it can make a determination as to which data stream belongs to which sequence: (k) or (k−1), as explained previously.

Figure 7A:
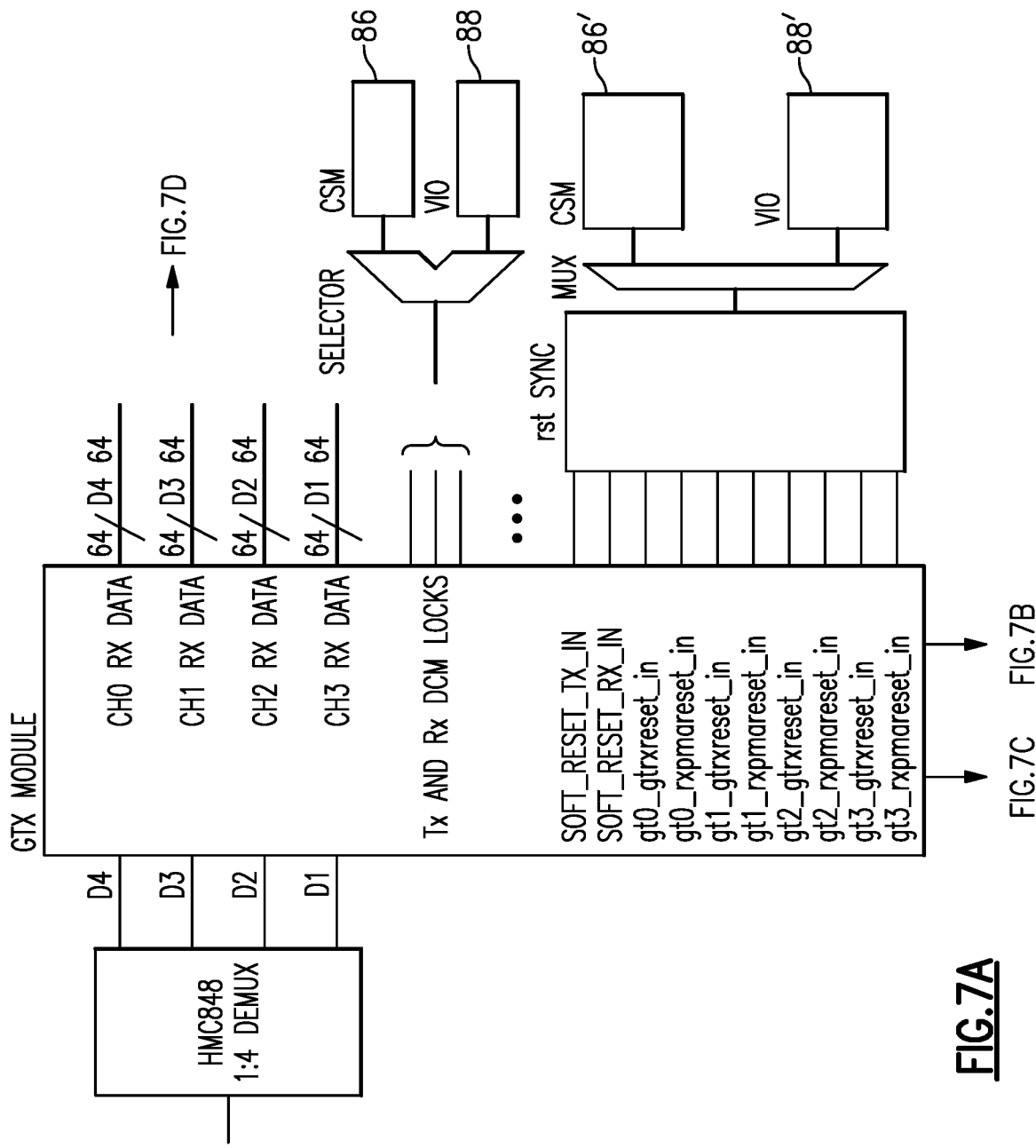
FIG. 7A-FIG. 7E show, in combination, a diagram of one (manual calibration) embodiment of the system of the present disclosure.
Figure 7B:
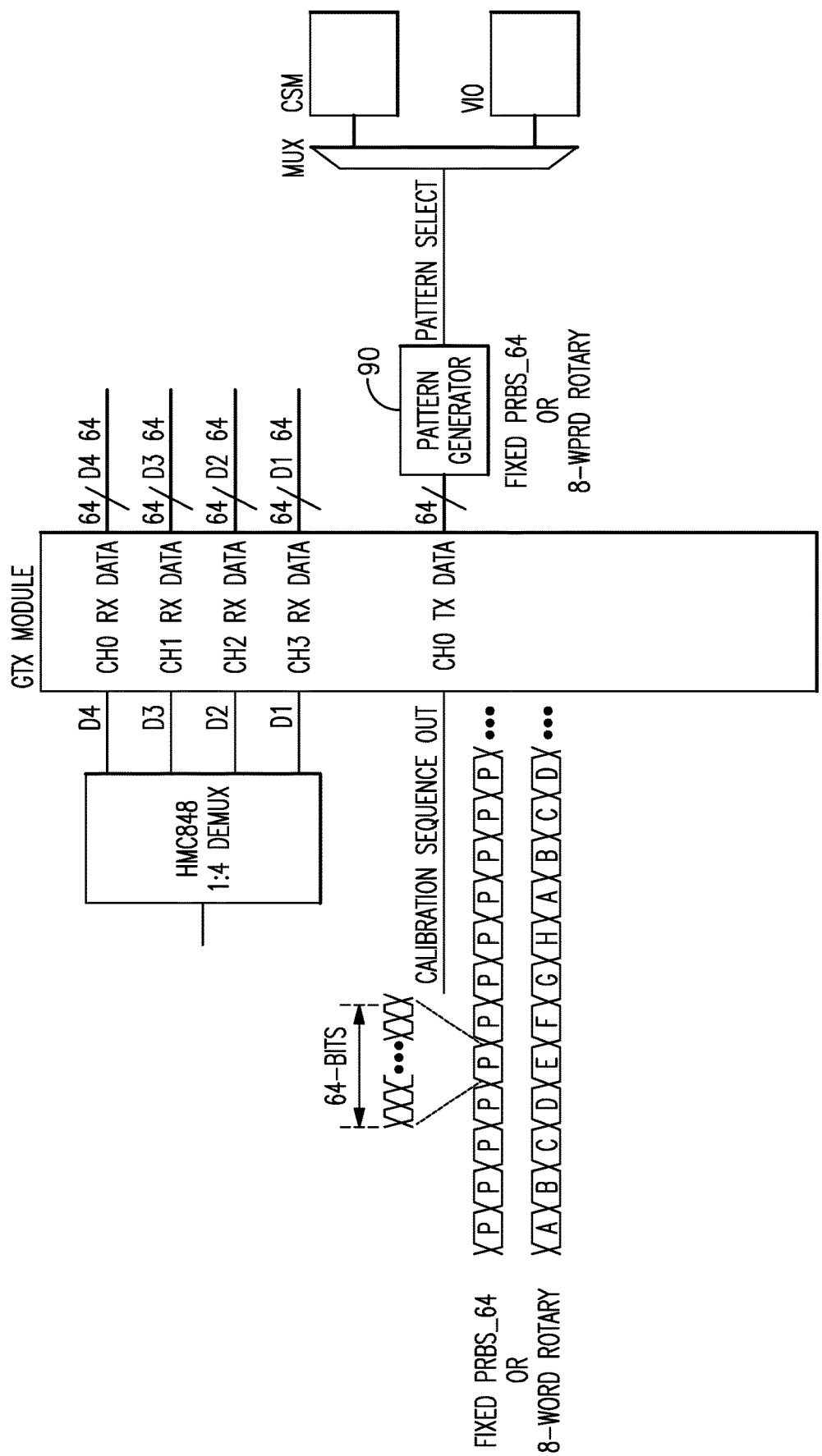
Figure 7C:
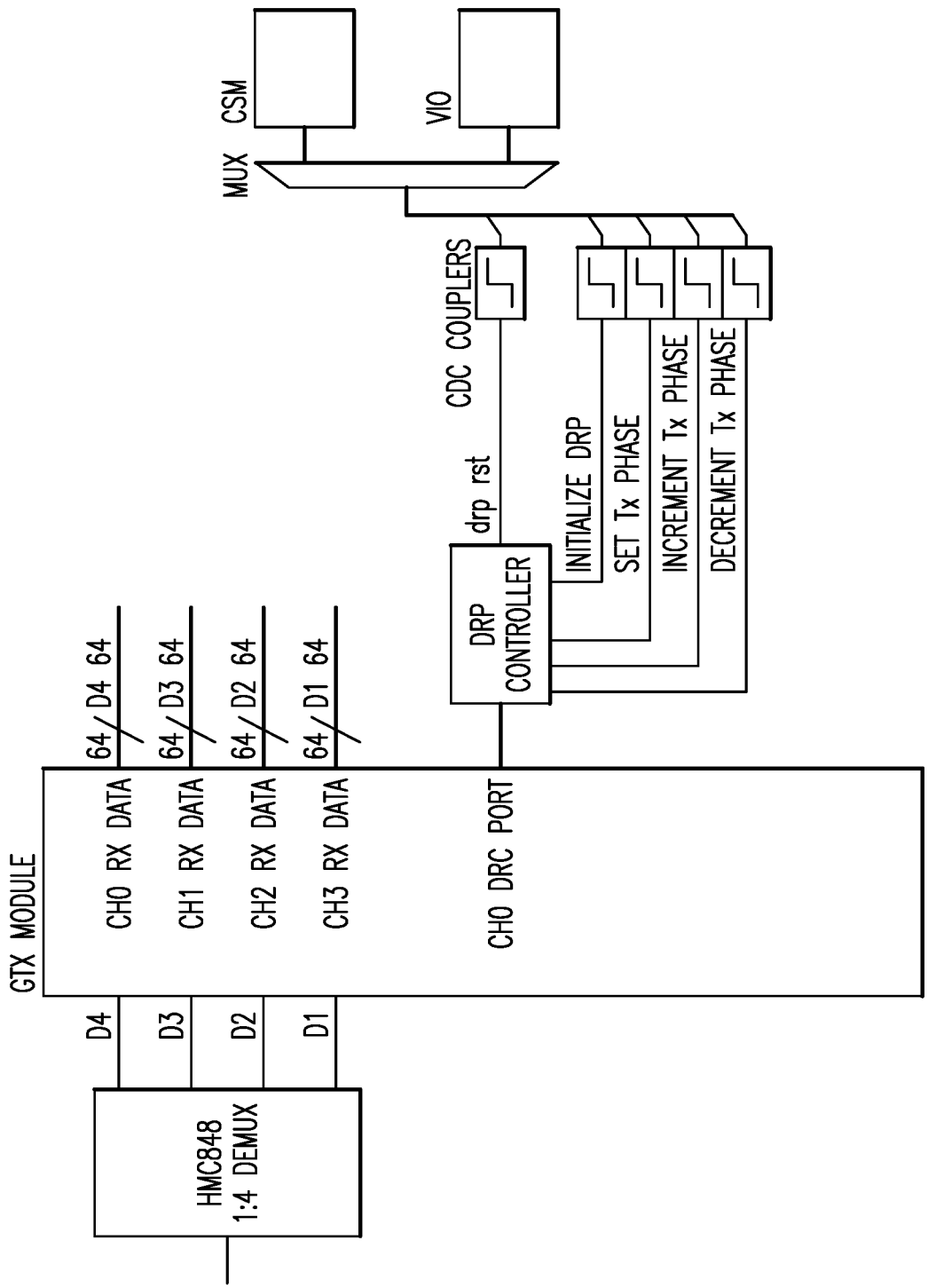
Figure 7D:
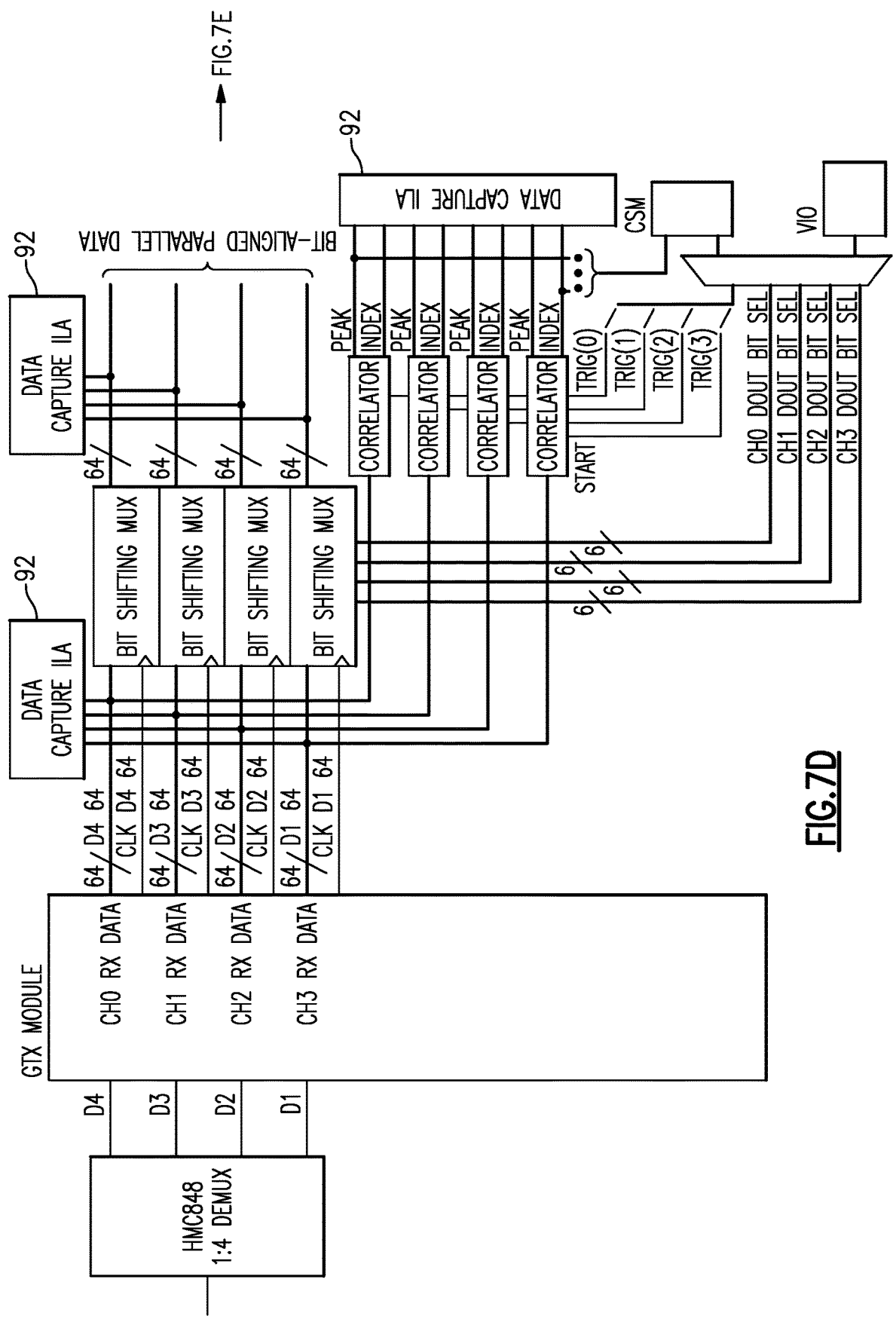
Figure 7E:
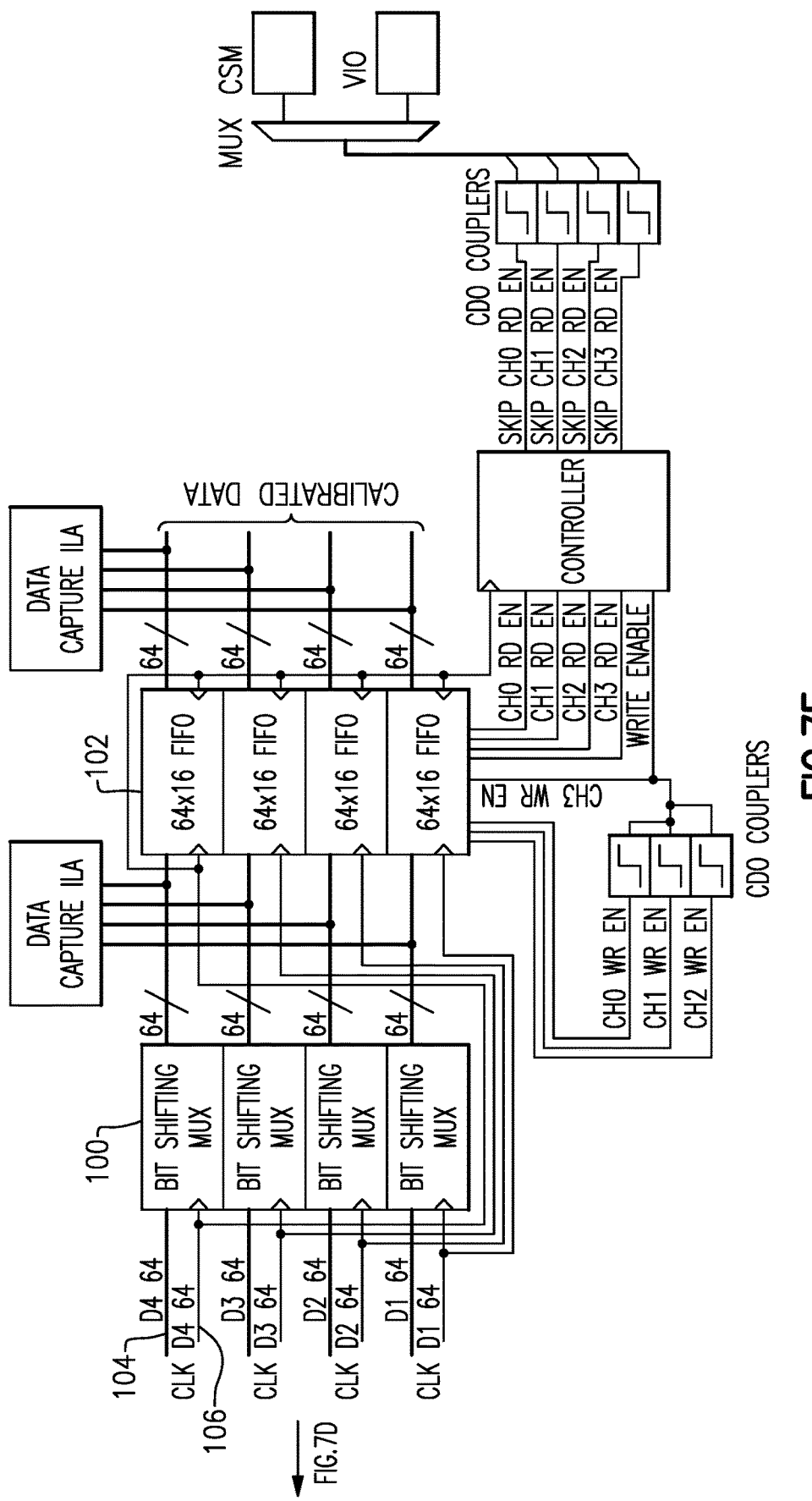

FIG. 7A-FIG. 7E, in combination, show a diagram of one (manual calibration) embodiment of the system of the present disclosure. As best seen in FIG. 7E, a first group of bit shifting multiplexers 100 are responsible for bit alignment and a second group of FIFOs 102 are used for bringing the output data to a single clock domain and for word alignment. In some cases, word alignment requires transmission of a repeating sequence of 64-bit long words.

In certain embodiments, there is one additional stage of calibration logic needed to capture lane data associated with their clock domains as shown in FIG. 7E. For each lane of GTX parallel data output D4_64, . . . , D1_64 104 there is corresponding clock data clk_D4_64, . . . , clk_D1_64 106. In one embodiment of the present disclosure, one clock is chosen (e.g., clk_D4_64) to be the single clock for ALL the data i.e. 4×64=256 bits and to run logic processing 256-bit wide data stream.

Figure 8:
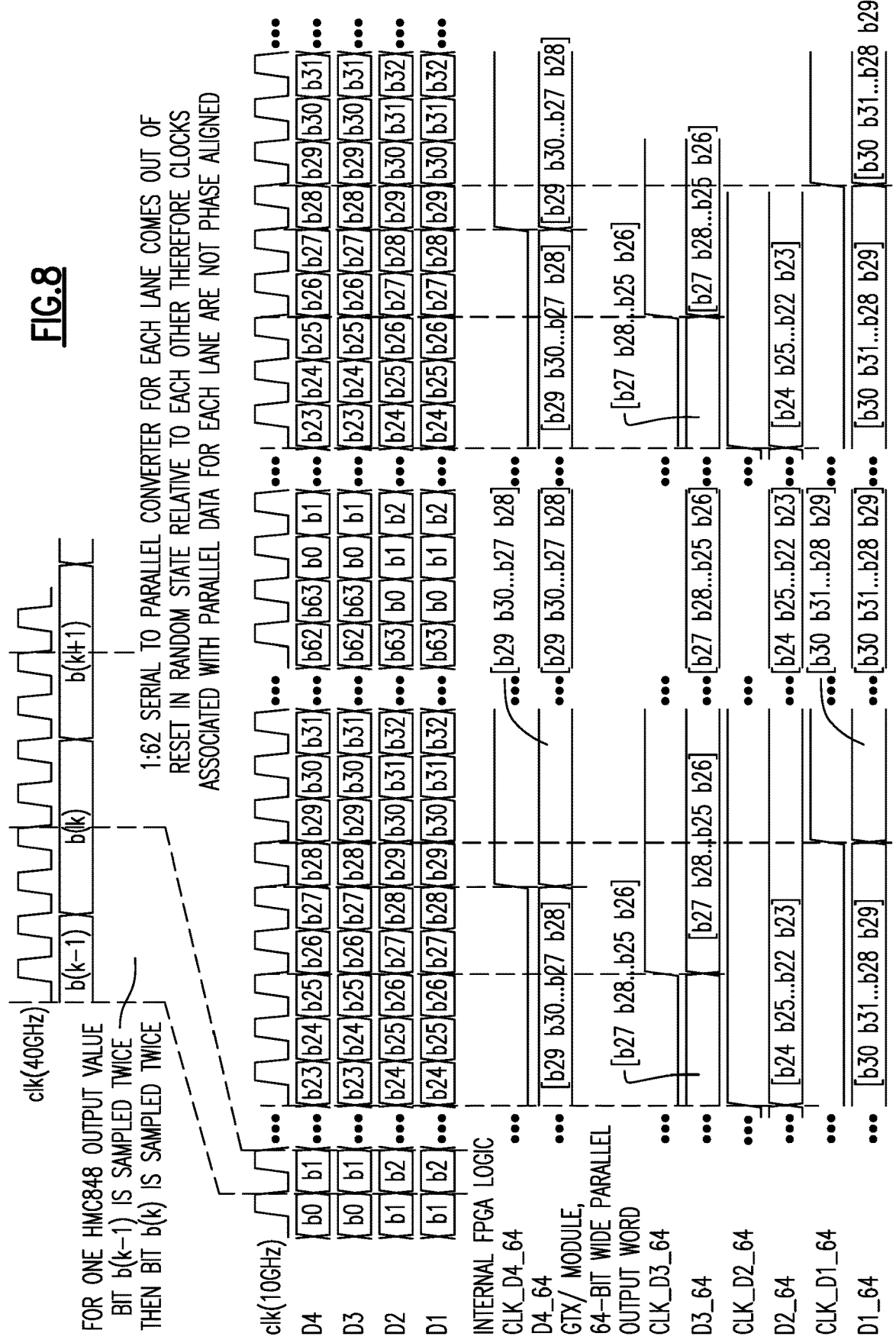
FIG. 8 shows one embodiment of the present disclosure where relative clock phases vary for each system power up.

FIG. 8 shows one example of how relative clock phases can vary for each system at power up. In some cases, the relative clock phases are fixed after the GTX reset is complete. Therefore, a mechanism must be able to move the data to a single clock domain and the final calibration stage needs to be able to accommodate this change. In some cases, FIFOs (first in, first out) are needed with separate input clock domains and one common output clock domain for synchronization. The write enables have to be synchronized to each FIFO's respective clock domain, which results in some uncertainty (because of CDC logic and power on cycle dependent phase relationship between the parallel data clocks) as to when exactly a particular FIFO starts collecting data. As a result, 64-bit data coming out of the FIFOs may, in some cases, be shifted by a word.

In order to resolve that shift, a pattern generator was designed to generate a sequence of eight 64-bit unique words. By skipping reads for appropriate channels (if needed), a final data alignment can be accomplished. When the data is aligned, four 'identical' words come out of each channel for each clock cycle. In reality, data for one group of channels will be shifted by one bit relative to the other to account for the fact that, in the 1:4 demux example, the output bits D4, D3, D2 and D1 do not represent the same bit of the incoming calibration sequence. D4 being the 'oldest' corresponds to (k−1) calibration sequence bit and D1 being the 'newest' corresponds to (k) calibration sequence bit when appropriate transmit clock phase is set to position the data eye of the calibration sequence such as shown in FIG. 5C. Note that for the situation shown in FIG. 5B, it is not possible to determine if D4 represents sampled (k)-th or (k−1)-th bit of the calibration sequence.

For manual calibration control and data capture, virtual input/output (VIO) and integrated logic analyzer (ILA) modules were included in the design of the system for the embodiment shown in FIG. 7A-FIG. 7E that was implemented in the lab for demonstrating manual calibration. FIG. 7A illustrates the logic and the first step of the calibration process. Upon system power up, when all reference clocks are stable, CSM (calibration state machine) 86, or the operator via VIO (for manual calibration) 88, asserts and de-asserts GTX module resets and then waits for the assertion of DCM locks. VIO stands for Virtual Input/Output and is it a part of the Xilinx device used for monitoring and driving internal FPGA signals. The Rst sync block represents CDC (clock domain crossing) logic.

FIG. 7B illustrates the logic and second step of the calibration process. There are two modes of operation for the calibration sequence pattern generator 90: one is repeating, 64-bit PRBS sequence and the other is the sequence of eight (it could be more or less), unique, 64-bit words. Note that for AC-coupled signal paths, the repeating sequence has to be DC balanced. Initially, a fixed, 64-bit, PRBS, repeating calibration sequence was selected.

FIG. 7C illustrates the logic for controlling the GTX Tx clock phase. The transmit clock phase control in one embodiment was been achieved using the above described feature of Xilinx GTX phase interpolators (FIGS. 6A and 6B) controlled via a DRC port. FIG. 7D illustrates the logic to achieve bit-alignment in one embodiment of the system of the present disclosure. In certain embodiments, ILAs (logic analyzers) along with VIOs were used for manual calibration. In some cases, a fully automated CSM (calibration state machine) has access to all relevant state and control signals as shown. FIG. 7E illustrates the logic and final stage of the calibration process, i.e. word alignment.

In conclusion, the system and method of the present disclosure receives and digitizes signals from the environment and delivers the resultant high-speed serial data directly to FPGA serial transceiver circuitry. In one embodiment of the system of the present disclosure, the approach significantly simplifies and extends the frequency range of mono-bit sampling receivers. In one case, mono-bit sampling was employed using the current generation of FPGAs GTX serial transceivers at 10 GBPS. Four high-speed lanes were received and synchronized using a training/calibration sequence pattern as described herein. The data was then demultiplexed (e.g., 1:64) and aligned using first in first out (FIFO) all within the FPGA transceiver cell and internal fabric. Thus, the system and method of the present disclosure can eliminate external demux components and move the functionality into the FPGA, which provides for more control and reliable operation.

In contrast, heritage systems used external demultiplexers that typically do not have a reset/synchronize capability to align the data. This conventional methodology involves a lot of external support circuitry and precise circuit lines in the printed circuit board design making it less favorable and more costly.

In one embodiment of the method of the present disclosure, as shown in FIG. 9, the system 900 is calibrated with a calibration/training sequence data rate (applied to the input) that is smaller (slower) than the input sample rate 910. One element of the calibration mechanism in this method is the capability to align the data edge with a time resolution much better, i.e. less than the period of the system input sampling clock 920. For example, for the period of 40 GHz, a system input sampling clock could be about 250 ps. Thus, the calibration sequence transmit clock phase control resolution needs to be such that one can move the calibration sequence data (aka training pattern) relative to the edge of the system input sampling clock with resolution better than 250 ps (e.g., 250 ps/4=62.5 ps or 250 ps/8=31.25 ps). The smaller the number, the better.

In some cases, for digital implementation of the phase interpolator the division factor is typically power of two, but in general it does not have to be. For example, one embodiment of the system utilizes an external programmable time delay circuit. In another embodiment, an internal GTX transmit clock phase interpolator can be used for synchronization and alignment. In general, any external circuit (phase shifter, programmable time delay, etc.) can be used to implement this feature.

It will be appreciated from the above that the invention may be implemented as computer software instead of firmware. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for high-speed data transfer comprising:
a pattern generator module configured to provide calibration sequence data that is transmitted to a 1:M demultiplexer via a transmitter at a transmitting rate, the transmitter being internal to a field programmable gate array;
the 1:M demultiplexer being configured to receive a system input data stream and produce a plurality of serial data streams, the plurality of serial data streams having a data rate that is faster than the transmitter rate;
a plurality of receivers for receiving the plurality of serial data streams from the 1:M demultiplexer, the plurality of receivers being internal to the field programmable gate array; and
a synchronization module configured to change a phase of a calibration sequence transmit clock to move the calibration sequence data, in time, relative to a system input sampling clock, thereby facilitating high-speed data transfer.

2. The system for high-speed data transfer according to claim 1, the field programmable gate array further comprising a plurality of internal demultiplexers and a plurality of first in first out modules.

3. The system for high-speed data transfer according to claim 1, the field programmable gate array further comprising a plurality of clock data recovery modules.

4. The system for high-speed data transfer according to claim 1, wherein M is 4, 8, 16, 32, 64, 128, or 256.

5. The system for high-speed data transfer according to claim 1, wherein the high-speed data is at least 40 GHz with at least 20 GHz of instantaneous bandwidth.

6. The system for high-speed data transfer according to claim 1, wherein the receiver and/or the transmitter are a transceiver.

7. The system for high-speed data transfer according to claim 1, wherein the synchronization module is selected from the group consisting of a transmit clock phase interpolator, a programmable time delay circuit, and a phase shifter.

8. The system for high-speed data transfer according to claim 1, wherein the pattern generator is implemented via hardware description language of the field programmable gate array.

9. A method of calibrating a high-speed data transfer system comprising:
providing a high-speed data transfer system having a calibration sequence data rate slower than an input sample data rate; and
changing a phase of a calibration sequence transmit clock with enough resolution to move, in time, the calibration sequence data relative to a system input sampling clock edge such that the resolution is less than a period of the system input sampling clock.

10. The method of calibrating a high-speed data transfer system according to claim 9, wherein changing the phase utilizes a transmit clock phase interpolator, a programmable time delay circuit, or a phase shifter.

11. The method of calibrating a high-speed data transfer system according to claim 9, the high-speed data transfer system further comprising a pattern generator module configured to provide calibration sequence data that is transmitted to a 1:M demultiplexer via a transmitter at a transmitting rate, the transmitter being internal to a field programmable gate array.

12. The method of calibrating a high-speed data transfer system according to claim 11, wherein M is 4, 8, 16, 32, 64, 128, or 256.

13. The method of calibrating a high-speed data transfer system according to claim 9, the high-speed data transfer system further comprising a plurality of receivers for receiving a plurality of serial data streams from a 1:M demultiplexer, the plurality of receivers being internal to a field programmable gate array.

14. The method of calibrating a high-speed data transfer system according to claim 13, wherein the 1:M demultiplexer is configured to receive a system input data stream and produce the plurality of serial data streams, the plurality of serial data streams having a data rate that is faster than a transmitter rate.

15. The method of calibrating a high-speed data transfer system according to claim 9, the high-speed data transfer system is at least 40 GHz with at least 20 GHz of instantaneous bandwidth.

* * * * *